United States Patent Office 2,979,490
Patented Apr. 11, 1961

2,979,490

CROSS-LINKING OF POLYMERS

Fred W. West, Paterson, N.J., assignor, by mesne assignments, to Minnesota Mining and Manufacturing Company, St. Paul, Minn., a corporation of Delaware No Drawing. Filed Oct. 26, 1956, Ser. No. 618,453

6 Claims. (Cl. 260—87.5)

This invention relates to cross-linking of hydrofluorinated polymers. In one aspect this invention relates to a new vulcanizable admixture. In another aspect this invention relates to a new vulcanized product. Another aspect of this invention relates to the cross-linking of linear hydrofluorinated olefin polymers. Still another aspect relates to the modification of the characteristics of chain saturated polymers containing hydrogen and fluorine substituents on the carbon atoms.

This application is a continuation-in-part of my prior copending application, Serial No. 372,159, filed August 3, 1953, in the name of Fred W. West. This application discloses the cross-linking of halogenated chain saturated polymers with polyamines.

Chain polymers are thermoplastic in nature and exhibit continuous flow under the influence of heat and pressure. Such polymers can be resoftened as often as desired and are usually soluble in selective solvents.

Cross-linked or spaced polymers, on the other hand, are generally thermosetting, that is to say that they are insoluble in all solvents and that they cannot be softened without decomposition once they have hardened. A chain polymer may, however, contain a small number of cross linkages without completely losing its thermoplastic properties.

It is often desirable to convert chain polymers to space polymers. This is done when it is desired to decrease solubility and thermoplastic flow and, in the case of chain elastomers, where it is desired to obtain a harder, tougher product. The cross-linking of elastomers is commonly referred to as vulcanization.

The nature of the cross-linking agent will vary with the nature of the chain polymer and with the nature of the cross-link desired. There are a number of reactions which may result in the cross-linking of a chain polymer. In some reactions the cross-linking agent will take part so that at least a portion of it forms the cross-link and appears in the final molecule. In other reactions the cross-linking agent acts solely as an activator and does not appear in the final molecule.

The chemistry of cross-linking is not well understood. Cross-linking agents successful with one type of chain polymer are often ineffective with another type and there appears to be no rule for predicting with accuracy whether or not a particular cross-linking agent effective with one type of chain polymer will be effective with another type. In fact, the term "cross-linking agent" itself, may cover materials which are chemically and physically dissimilar but have in common the characteristic that each is effective for cross-linking at least one chain polymer.

Among the most useful of the thermoplastic and elastomeric resins are those prepared by the polymerization of fluorinated monoolefins and particularly those prepared from fluorinated monoolefins containing not more than three carbon atoms per molecule. Among the resins prepared by the polymerization of such substituted monoolefins are the homopolymers of vinylidene fluoride, vinyl fluoride and trifluoroethylene and copolymers of vinylidene fluoride, vinyl fluoride, trifluoroethylene, hexafluoropropene and tetrafluoroethylene. Many of these thermoplastic and elastomeric polymers have unique and valuable properties such as a high chemical resistance and good heat stability. In some cases, it is desired to retain these valuable properties while at the same time, to decrease the flowability and solubility by cross-linking. In the past, it has been difficult to cross-link polymers of this type satisfactorily.

It is, therefore, an object of this invention to cross-link hydrofluorinated chain saturated polymers.

Another object of this invention is to cross-link linear polymers prepared by the polymerization of hydrofluorinated monoolefins to improve the characteristics of the polymer.

Another object of this invention is to convert thermoplastic chain polymers produced by the polymerization of hydrofluorinated monoolefins to thermosetting space polymers of reduced solubility and thermoplastic flow.

Another object is to convert chain elastomers produced by the polymerization of hydrofluorinated monoolefins into soft vulcanizates of increased strength but unreduced and even superior extensibility.

Still another object of this invention is to produce a hydrofluorinated chain polymer which can be cast into sheets or molded at an elevated temperature.

Other objects and advantages of the present invention will become apparent to those skilled in the art from the accompanying description and disclosure.

According to this invention a hydrofluorinated polymeric material is reacted with a polyamine to produce a cross-linked polymer. The polyamine which serves as a cross-linking or vulcanizing agent, which is preferably an acyclic hydrocarbon polyamine, is uniformly admixed with the hydrofluorinated polymeric material and is permitted to cross-link therewith.

The linear polymers which are cross-linked in accordance with this invention are those which are produced by the polymerization of hydrofluorinated olefins, that is, olefins containing only hydrogen and fluorine substituents on the carbon atoms and preferably having at least one fluorine atom per carbon atom. The hydrofluorinated olefins are preferably hydrofluoroethylenes such as, for example, trifluoroethylene, 1,2-difluoroethylene and vinyl fluoride. The polymers are preferably those having at least one fluorine per carbon atom and at least one hydrogen atom per three carbon atoms in the molecule. For example, in an olefin-containing two carbon atoms, at least two fluorine atoms are present in the molecule. These fluorine atoms may be distributed so that two fluorine atoms are bonded to the same carbon atom or one fluorine atom is bonded to each of the carbon atoms. However, it is also within the scope of this invention to cross-link polymers of hydrofluorinated mono and diolefins containing between three and five carbon atoms, such as, 2,3,3,3-tetrafluoropropene, 1,1,2-trifluorobutadiene-1,3, 1,1-difluoro-2-methylbutadiene-1,3, 1,1-difluorobutadiene-1,3, 2-trifluoromethylbutadiene-1,3, and isomers thereof. These monomers may be homopolymerized or copolymerized to provide suitable starting materials for the process of this invention. Examples of hydrofluorinated olefin copolymers are any combination of the above-mentioned hydrofluorinated monomers with perfluorinated olefins such as, for example, hexafluoropropene or tetrafluoroethylene. The preferred copolymers are those of the above hydrofluorinated ethylenes and hexafluoropropene or tetrafluoroethylene. Most preferred of the hydrofluorinated olefin polymers which are cross-linked by the process of this invention are the polymers wherein at least half of the carbon atoms are bonded to fluorine atoms.

The hydrofluorinated olefin polymers of the present invention may be prepared in either an emulsion or a water suspension type system and may be employed in the cross-linking reaction as elastomers or as latices.

These hydrofluorinated olefin polymers may be converted by the method of this invention to insoluble and infusible space polymers which retain, for the most part, the desirable chemical inertness and physical strength of the plastic.

The hydrofluorinated polymers may be copolymerized to produce rubber-like polymers displaying elastomeric properties, high tensile strength and flexibility at relatively low temperatures. These polymers possess the above-mentioned physical properties and also show a high degree of chemical inertness. They are also relatively easily soluble in various solvents and vehicles prior to cross-linking.

The polyamine compounds employed as cross-linking or vulcanizing agents in the process of the present invention are cyclic or acyclic polyamines containing at least two amino groups which are primary or secondary amino groups.

The preferred cross-linking agents are those which are aliphatic hydrocarbon polyamines containing at least two amino groups, two of which are terminal primary amino groups. These preferred polyamine vulcanizing agents correspond to the following general formula:

$$H_2N\text{---}(R\text{---}NH)_n\text{---}H \quad (1)$$

wherein R is an aliphatic hydrocarbon radical, most preferably a hydrocarbon radical containing not more than 15 carbon atoms and $n$ is an integer between 1 and 12, most preferably between 1 and 6.

Examples of preferred cross-linking agents which are employed in the process of this invention are ethylenediamine, diethylenediamine, diethylenetriamine, triethylenetetramine, tetraethylenepentamine, hexamethylenediamine, pentamethylenediamine, decamethylenediamine and undecamethylenediamine. Examples of other polyamine vulcanizing agents which are suitably employed in the process of this invention include N-trichloromethylpentamethylenediamine, N-phenylhexamethylenediamine, 1,5-naphthalenediamine, diaminoanisole, diaminobenzoic acid and isomers thereof, diaminostilbene and isomers thereof, diaminotriphenylmethane, triaminotriphenylmethane, diaminophenol and isomers thereof, tetramino-3,3-dimethyldiphenylmethane, diaminobenzene and isomers thereof, triaminobenzene and isomers thereof, triaminobenzoic acid and isomers thereof, triaminophenol, 1,2-propylenediamine and 1,2,3-triaminopropane.

The amount of vulcanizing agent employed in the reaction can be varied over a wide range depending upon the number of the cross-links desired in the polymer and the particular polymer employed. The amount of polyamine employed as a cross-linking agent may be varied between about 0.1 and about 15 parts by weight per 100 parts by weight of polymer. Generally, an amount between about 1 and about 10 parts by weight per 100 parts by weight of polymer is used in the cross-linking process of this invention.

While it is not desired to be bound by any particular theory of operation, it is the present understanding that hydrogen-containing amino groups are effective as linking agents with the aforesaid hydrofluorinated chain polymers, in that a hydrogen atom of the amino group and a fluorine atom bonded to a carbon atom of the polymer chain combine to condense out a hydrogen fluoride molecule and thereby permit the nitrogen atom of the amino group to be bonded directly to the carbon atom from which the fluorine has been removed. With a polyamine more than one such linkage takes place on the molecule of the linking agent thus linking one polymer chain to another. The linking portion of the preferred polyamine cross-linking agent is illustrated by the formula $$\text{---}NH\text{---}(R\text{---}NH)_n\text{---} \quad (2)$$

wherein R is an aliphatic hydrocarbon radical; most preferably a hydrocarbon radical containing not more than 15 carbon atoms and $n$ is an integer between 1 and 12; most preferably between 1 and 6. The structure shown in Formula 2 may from the cross-link per se or it may undergo further decomposition; that is to say the remaining hydrogen on the nitrogen atom in Formula 2 may be removed by condensing out an additional molecule of hydrogen fluoride. In this way the cross-link may contain a nitrogen atom which becomes doubly bonded to a carbon atom of the polymer chain.

Since hydrogen fluoride is evolved in the reaction, the linking proceeds most favorably when provision is made for removal of hydrogen fluoride. To some extent, and generally when cross-linking thin polymer sections, hydrogen fluoride may be vented off at the temperatures used in the cross-linking reaction. In the majority of cases, however, it is desired to neutralize any hydrogen fluoride by the addition of an inorganic basic compound such as a metal oxide, for example, lead oxide, magnesium oxide, zinc oxide, or a mixture of zinc oxide and lead oxide-lead phosphite. Although the removal of hydrogen fluoride is not essential for the preparation of a suitably cross-linked polymer, it is usually preferred to add between about 1 and about 25 parts by weight of the inorganic basic compound per 100 parts by weight of polymer.

Additional adjuvants such as fillers, for example, Syton 200, HiSil 303 and carbon black; stabilizers, for example, perchlorofluorocarboxylic acids and Terginol-G; coloring agents, for example, chrome green and iron oxide red; plasticizers, for example, hydrocarbon polyesters such as dioctyl sebacate, etc., may be compounded in the polymeric mixture if so desired.

In carrying out the process of this invention, the desired amount of polyamine vulcanizing agent is added and is uniformly and intimately mixed with the unvulcanized hydrofluorinated polymer or with the unvulcanized hydrofluorinated polymeric mixture at a temperature not exceeding about 100° C. The resulting mixture is then pressed at a temperature between about 100° C. and about 250° C., preferably between about 150° C. and about 180° C. for a period of from about 10 minutes to about 15 hours, preferably from about 0.5 hour to about 2 hours under a pressure of between about 100 and about 2,000 pounds per square inch gauge, preferably between about 500 and about 1,000 pounds per square inch gauge. The vulcanizable admixture may be pressed into sheets or pressed in a mold.

The molds may be coated with a silicone emulsion or silicone oil, for example, DC-200, and prebaked for about 4 hours at a temperature of about 250° C. Certain elastomers have been found to have better release properties when molded under these conditions, however, this coating step may be omitted if desired.

The resulting pressed vulcanizate is then baked in an oven at a temperature of between about 100° C. and about 200° C., preferably at about 175° C. for a period of from 2 hours or less to 25 hours depending upon the cross-sectional thickness of the sample. The molds are usually baked at atmospheric pressure, however, pressures up to 15 or 20 atmospheres can be applied if so desired.

Since mechanical mixing generates heat and since it is difficult to blend other materials into a cross-linked polymer, it is usually desired to blend any other material such as fillers, coloring agents, etc., into the polymer first and then add the cross-linking agent just before fabrication. Any of the above-mentioned adjuvants may be so blended with the polymer.

With certain polymers and for certain uses, particularly for coatings, polymers may be cross-linked after being deposited from solution. The polymer and cross-linking agent are dissolved in a suitable solvent; the solution is applied to a surface such as a fabric, plastic or metal, and the coating is dried and heated to cross-link the polymer. In some cases, the coating is adherent and in other cases, it may be stripped off to form a self-supporting film of cross-linked polymer.

polytrifluoroethylene plastic which was prepared without the addition of a cross-linking agent.

TABLE 1
SOLUBILITY PROPERTIES[1] OF CAST FILMS OF POLYTRIFLUORO-ETHYLENE PLASTIC AT SEVERAL STAGES IN THEIR CURE WITH TETRAETHYLENEPENTAMINE

| Polymer | Parts of Tetra-ethylene-pentamine Present per 100 parts of Polymer | Curing Temperature (time) | | | |
|---|---|---|---|---|---|
| | | Before Heating | 130° C. (4 hrs.) | 170° C. (16 hrs.) | 200° C. (16 hrs.) |
| Polytrifluoro-ethylene Plastic. | none (blank run). | soluble | soluble | soluble | substantially soluble. |
| | 6 | substantially soluble. | insoluble, tough. | insoluble, tough. | insoluble, tough. |

[1] The solubility properties of this sample were determined by completely immersing in the solvent, tetrahydrofuran, at room temperature and allowing the mixture to stand overnight without agitation. When a rating of "soluble" or "substantially soluble" is given, little if any cure is indicated. The rating of "insoluble, tough" indicates a good cure and is the best rating possible in this test.

Still another method of cross-linking a chain polymer involves the use of a milky emulsion or latex. As stated above, any of the hydrofluorinated polymers may be prepared in a water suspension type system. In such a system the product is removed from the reactors as a latex. For preparations such as dip coating, spraying and knife coating the latex is used directly. In these cases additives such as cross-linking agents and other adjuvants are dispersed in water containing a surface active agent and these dispersions are blended with the latex. The latex is then applied as a coating to a surface and the polymer is cross-linked as the latex is dried and heated.

Still another method of reacting the chain polymer with the polyamine cross-linking agents of the present invention, involves the reaction of the polyamine with the hydrofluorinated polymer in its finished fabricated state. Since this method involves penetration of the polymer by the reactive polyamines, it is adaptable primarily to very thin sections of polymer such as in coatings or in the preparation of self-supporting films. The coating or film is maintained in contact with the polyamine cross-linking agent at elevated temperatures and preferably under a suitable pressure for a period of time ranging from a few seconds to several days. This method also results in changing the characteristics of the hydrofluorinated chain polymer to those of a hydrofluorinated space polymer.

The following example is offered as a better understanding of the present invention and is not to be construed as unnecessarily limiting thereto.

EXAMPLE 1

A clear tetrahydrofuran solution of polytrifluoroethylene was prepared by shaking 100 parts by weight of the polymer in 1,900 parts by weight of tetrahydrofuran at room temperature and were then added 6 parts by weight of tetraethylenepentamine. After shaking for a few minutes, or until the solution was complete, a film was cast on a glass plate. The solvent was allowed to evaporate from the film at room temperature using no special conditions to obtain the film, such as protecting the film from atmospheric moisture or light, on applying irrigation or moisture to the film. At this time the film was readily dissolved by tetrahydrofuran. The film was then heated to 130° C. for 4 hours and allowed to cool to room temperature after which the film was again tested with tetrahydrofuran. It was found that the film was completely insoluble in tetrahydrofuran and also in any of the other common organic solvents such as esters, ketones, ether, alcohols, aromatic and aliphatic hydrocarbons and halocarbons. The film was then reheated at 170° C. and at 200° C., and the solubility behavior determined after each heating treatment and the results are shown in Table 1 wherein the cross-linked polymer is compared with The same general procedure was repeated using p,p'-diphenylmethanediisocyanate and also using toluenetriisocyanate instead of tetraethylenepentamine. Polyisocyanates gave inferior cures compared with that of the polyamine.

Any of the other polyamines previously cited and particularly ethylenediamine, diethylenetriamine, triethylenetetramine and hexamethylenediamine may be substituted in this example to give equally satisfactory cures of any of the heretofore mentioned hydrofluorinated polymers, particularly the elastimeric copolymers of hydrofluorinated ethylenes containing one fluorine atom per carbon atom and hexafluoropropene or tetrafluoroethylene.

The cross-linked hydrofluorinated polymers prepared by the process of this invention may be used for most of the purposes for which the chain hydrofluorinated polymers have been used. The only important exceptions are that they cannot be molded and cannot be put into solution after cross-linking. In a practical sense, however, the cross-linking step can be performed as the final step in fabrication and thereby making subsequent solution or molding unnecessary.

Molded articles can be made as described above by heating and compressing a mixture of the hydrofluorinated polymer and the cross-linking agent in a mold. The articles thus produced have all the advantages of chemical inertness, characteristics of the hydrofluorinated polymer, and at the same time, have greater toughness and better heat stability. Some of the molded articles which can be produced from these hydrofluorinated polymers are gaskets, O-rings, diaphragms, impervious films, seals for fuel cells, etc.

Films of cross-linked hydrofluorinated polymer in solution form in situ, may be used for the protection of metallic surfaces against corrosion and organic surfaces against moisture and chemical action. Such films have substantially the same chemical inertness as the film of the unvulcanized hydrofluorinated polymer but greater toughness and better heat resistance.

Self-supporting impervious films of the cross-linked polymer can also be made. In the case of rubbery copolymers crosslinking produces vulcanizates of increased strength but unreduced and superior extensibility.

The cross-linked polymers of this invention can also be used as wire coatings since the advantageous electrical properties of the hydrofluorinated polymers are also present in the cross-linked polymer. The cross-linked polymers of this invention may also be used as impregnants and/or as coatings for yarns and fabrics, including the yarns and fabrics of asbestos, glass, synthetic resins and natural fibers.

The present invention relates to the novel cross-linking process of hydrofluorinated olefin polymers with a polyamine, preferably an aliphatic hydrocarbon polyamine.

It is to be understood that various modifications and alternatives of the procedure set forth herein may become apparent to those skilled in the art without departing from the scope of this invention.

Having thus described my invention I claim:

1. The process which comprises uniformly admixing a polymer containing as substituents only fluorine and hydrogen of a polyfluorinated hydrogen-containing olefin containing only fluorine and hydrogen and from 2 to 4 carbon atoms wherein at least half of the carbon atoms are bonded to fluorine atoms, with an alkylene polyamine crosslinking agent selected from the group consisting of polyamines containing at least two amino groups selected from the group consisting of primary amino groups and secondary amino groups in an amount of between 0.1 to 15 parts by weight of polyamine per 100 parts by weight of polymer at a temperature not exceeding 100° C. to form a mixture of said polymer and said polyamine and subsequently heating said mixture at a temperature of from above 100 to 250° C., for a period of from 10 minutes to 15 hours, and under a pressure of 100 to 2000 pounds per square inch gauge whereby said polymer is crosslinked by said polyamine.

2. The crosslinked product of claim 1.

3. The process of claim 1 wherein said polyamine is tetraethylenepentamine.

4. The process of claim 1 wherein said polyamine is hexamethylenediamine.

5. The process of claim wherein said polyamine is triethylenetetramine.

6. The process of claim 1 wherein said polyamine is diethylenetriamine.

References Cited in the file of this patent

UNITED STATES PATENTS

| | | |
|---|---|---|
| 2,117,591 | Alexander | May 17, 1938 |
| 2,405,008 | Berry et al. | July 30, 1946 |
| 2,451,174 | Reuter | Oct. 12, 1948 |
| 2,491,443 | Cox et al. | Dec. 13, 1949 |
| 2,514,185 | Eberly | July 4, 1950 |
| 2,614,092 | Reilly | Oct. 14, 1952 |
| 2,659,716 | Park | Nov. 17, 1953 |
| 2,788,306 | Cox et al. | Apr. 9, 1957 |
| 2,793,200 | West | May 21, 1957 |

FOREIGN PATENTS

| | | |
|---|---|---|
| 583,686 | Great Britain | Dec. 24, 1946 |